July 8, 1941.    R. M. ROWELL    2,248,586
FREQUENCY METER
Filed July 6, 1940

Inventor:
Ralph M. Rowell,
by Harry E. Dunham
His Attorney.

Patented July 8, 1941

2,248,586

UNITED STATES PATENT OFFICE 2,248,586

FREQUENCY METER

Ralph M. Rowell, Lynn, Mass., assignor to General Electric Company, a corporation of New York Application July 6, 1940, Serial No. 344,282

6 Claims. (Cl. 175—368)

My invention relates to frequency meters and its object is to provide a short range frequency meter of high sensitivity and accuracy. By a short range frequency meter I mean, for example, a meter suitable for measuring the frequency variation between 59 and 61 cycles rather than from 0 to 65 cycles.

In carrying my invention into effect I employ a sensitive direct current measuring instrument having its scale calibrated in frequency. This instrument is energized through a rectifier and a tuned circuit from the source of frequency to be investigated and I introduce into this circuit a bucking voltage or the equivalent to cause the instrument to have zero current or zero response at a selected frequency corresponding to some definite point on the resonance curve of the instrument circuit. The different voltages energizing, and introduced into, the system are maintained constant or sufficiently so as to eliminate any influence of voltage variations. I may arrange matters so that I may employ the entire scale range of the instrument for frequency variations above the resonance point and also for frequency variations below the resonance point without any change in connections.

Figure 1:
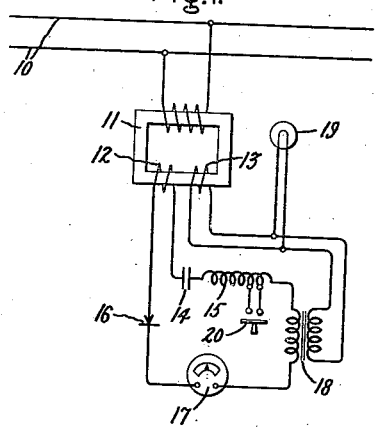
Figure 2:
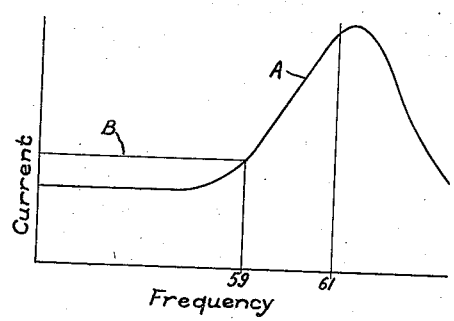
Figure 3:
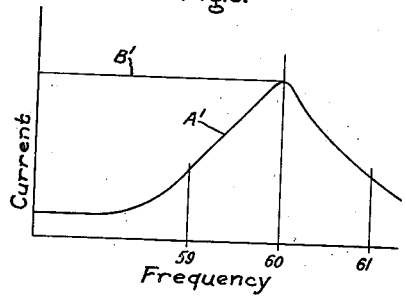
Figure 4:
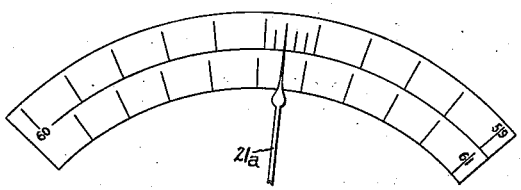
Figure 5:
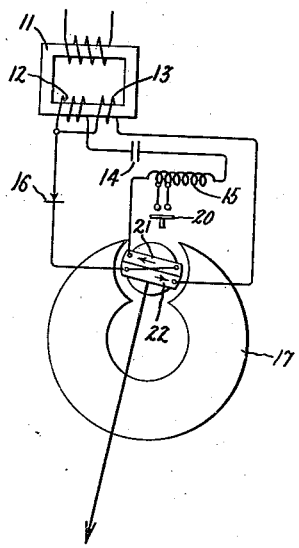

The features of my invention which are believed to be novel and patentable will be pointed out in the claims appended hereto. For a better understanding of my invention reference is made in the following description to the accompanying drawing in which Fig. 1 represents the circuit connections of my invention; Figs. 2 and 3 represent resonant curves to be referred to in explaining the invention; Fig. 4 is a double scale that may be employed on the direct current instrument; and Fig. 5 shows the use of a differential instrument for carrying out the invention.

Referring to Fig. 1, 10 represents an alternating current circuit and in order to give a practical illustration it will be assumed that the normal frequency of the circuit is 60 cycles and has a frequency variation from 59 to 61 cycles which it is desired to indicate with great accuracy. 11 represents a saturated core transformer or some equivalent device to obtain energizing currents for the measurement circuits which are independent of the normal voltage fluctuations that may occur on line 10. The transformer has two secondary coils 12 and 13. On coil 12 energizes a tuned circuit containing a condenser 14, an inductance 15, a rectifier 16 and a sensitive direct current instrument 17. The instrument 17 and the rectifier apparatus 16 constitute a rectifier instrument and in practice the rectifier apparatus is placed within the instrument casing. The coil 13 is connected through a transformer 18 to introduce a voltage into the instrument circuit which bucks the A.-C. voltage therein. Hence the instrument is energized in accordance with the differential energy in the two circuits supplied from the transformer secondaries. The rectifier may be of the full wave type but this is not essential. The transformer 11 may also be used to materially reduce the voltage between line 10 and the secondary circuits in cases where the line 10 is of high voltage.

Now let us assume that the instrument circuit is tuned for resonance just above 61 cycles and that it has a steep slope resonance curve that rises between 59 and 61 cycles, as shown in Fig. 2 at A. For instance, assume that the current tending to flow in the resonance circuit increases by 100% between 59 and 61 cycles. Let it further be assumed that the bucking transformer 18 produces a bucking current flow B that reduces the resultant current flow in the instrument circuit to zero at 59 cycles. Then at 59 cycles the instrument 17 will read zero and will deflect as the frequency increases to 61 cycles. The instrument will have such a rating as to produce substantially a full scale deflection at 61 cycles and hence the scale may be calibrated in frequency graduations from 59 to 61 cycles. It is evident that the arrangement is free from voltage errors. Also, the effect of transformer 18 on the resonant circuit is constant and does not introduce any complication. In order to distinguish between a zero instrument reading occasioned by zero voltage on line 10 and a 59 cycle condition, I may connect a voltage indicating device 19 such as a lamp across the transformer coil 13.

In the example above given it would have been equally feasible to arrange matters so that instrument 17 had zero current when the frequency was 61 cycles in which case the deflecting current would be furnished by the bucking transformer 18 causing an up-scale deflection as the frequency decreased to 59 cycles. This would reverse the instrument scale calibration but would require no change in the instrument connections since the direction of rectified current through the instrument would be the same.

This feature permits of employing the instrument scale twice, once for frequencies below the resonant point and again for frequencies above the resonant point. This is illustrated by Figs. 3 and 4. In Fig. 3 I have shown a resonance curve A' for a circuit sharply tuned for resonance at 60 cycles, and a bucking current B' equal to the maximum resonance current which occurs at 60 cycles. Hence the direct current instrument will read zero at 60 cycles and we may mark such zero indication 60 cycles, as shown at the left end of the scale in Fig. 4. As shown in Fig. 3, the important part of the resonance curve extends from 59 to 61 cycles. Hence, if the frequency decreases from 60 cycles to 59 cycles, the direct current instrument will produce an up-scale deflection. It will do the same thing if the frequency is raised from 60 to 61 cycles. Hence by using a resonance curve which is as symmetrical as possible, we may use the entire deflection range of the instrument twice, as indicated by the two scales shown in Fig. 4. In case the two slopes of the resonance curve are not symmetrical, the upper scale calibrations for 59 to 60 cycles will be correspondingly different from the lower scale calibrated for the 60 to 61 cycle range, and the two scales of Fig. 4 are shown slightly different for this reason. This double use of the scale range does not require any change in connections since the rectifier used at 16 passes current in only the proper direction for an up-scale deflection. It is, however, desirable to provide some kind of indicator to tell one whether the upper or lower scale should be read.

A simple expedient for this purpose is to momentarily change the tuning of the resonance circuit and at 20 in Fig. 1 I have shown a push button switch that may be used to slightly and momentarily reduce the inductance in the resonant circuit. If the instrument pointer 21a, Fig. 4, moves towards the left when the push button switch is momentarily closed, it means that the lower scale should be used. If it moves to the right, the upper scale should be used. This is because decreasing the inductance would cause the resonance curve to shift to the left with respect to the frequency graduations in Fig. 3. This push button may also be used in place of the lamp 19 to distinguish between a 60 cycle indication and a no-voltage condition. Since, if the frequency is 60 cycles and the pointer stands at the zero deflection point on the scale, a change in tuning will produce a deflection.

It is evident that under abnormal frequency conditions no damaging high current can flow in the instrument circuit.

In Fig. 5 I have shown a modification where the bucking voltage effect is introduced into the indicating instrument directly rather than through a transformer. The instrument is of the differential type having two coils 21 and 22. Coil 21 is included in the tuned circuit and coil 22 is contained in a circuit supplied by the coil 13 of the transformer 11. The currents in the two coils are in such directions as to neutralize each other and may be equal or have equal effects at some selected frequency condition such for example as 60 cycles when the tuned circuit is at exact resonance. Current B' of Fig. 3 may then correspond to the current in coil 22 and current A' of Fig. 3 may correspond to that in coil 21 producing a zero deflection at resonance. For frequencies above and below resonance, coil 22 will predominate to produce a deflection proportional to the frequency change and the indication read on the upper or lower scale depending upon whether the frequency is above or below 60 cycles. This modification is otherwise similar to that of Fig. 1.

What I claim as new and desire to secure by Letters Patent of the United States, is:

1. Frequency variation measuring apparatus comprising a rectifier instrument, a saturated core transformer having two secondary windings, connections for energizing said instrument from said secondary windings such that the instrument will respond to the difference in the energies supplied by said windings, and circuit tuning means included in the circuit of one of said secondary windings to cause the instrument response to vary with frequency over the frequency variation measurement range.

2. Frequency variation measuring apparatus comprising a rectifier indicating instrument, an alternating current source of variable frequency and voltage, a transformer designed to give a substantially constant voltage when energized at the normal voltage of said source and having two secondary windings, and circuits therefor, a second transformer coupling said secondary winding circuits in voltage opposition, one of said circuits being tuned to cause the current therein to vary with the frequency variations of said source and one of said circuits being connected to energize said rectifier instrument.

3. Frequency variation measuring apparatus comprising a saturated core transformer having two secondary windings, a rectifier instrument, a tuned circuit connected to energize said instrument from one of said secondary windings, and a transformer energized from the other secondary winding for introducing a bucking voltage into the tuned circuit such as to reduce the instrument current to a zero value within the frequency variation measurement range of such apparatus.

4. Frequency variation measuring apparatus comprising a saturated core transformer having two secondary windings, a rectifier instrument of the differential type, circuits connected to energize said instrument differentially from the two secondary windings, and one of said circuits being tuned to produce a marked variation in the energization of said instrument over the frequency variation range of said apparatus.

5. Frequency variation measuring apparatus comprising a direct current measuring instrument of the indicating type, rectifier apparatus, a pair of circuits connected to produce a differential energization of said instrument through said rectifier apparatus from the frequency varying source to be investigated, one of said circuits containing tuning means to cause the current therein to vary in response to the frequency variations over the range of frequency variation to be measured and to cause the circuit to be in resonance at a given frequency within said range at which frequency the differential energization of said instrument is zero, whereby the instrument is caused to indicate in the same manner for frequency variations above and below said given resonance value, and means for temporarily changing the tuning of said tuned circuit to determine if the instrument is indicating above or below the resonance frequency.

6. Frequency variation measuring apparatus comprising a rectifier indicating instrument, a pair of circuits connected to produce a differential energization of said instrument from the source of frequency to be investigated, one of said circuits being tuned to resonance at a given frequency within the measurement range, at which frequency the differential energization of said instrument is zero whereby the instrument is caused to indicate in the same manner for frequency variations above and below such resonant value, said instrument having a scale provided with two sets of calibrations, one set corresponding to frequency variations above such resonance value and the other set corresponding to frequency variations below such resonance value.

RALPH M. ROWELL.